(12) United States Patent
Lew

(10) Patent No.: US 6,644,757 B2
(45) Date of Patent: *Nov. 11, 2003

(54) WHEEL HUB

(75) Inventor: Paul Lew, Las Vegas, NV (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/342,806

(22) Filed: Jan. 15, 2003

(65) Prior Publication Data

US 2003/0122416 A1 Jul. 3, 2003

Related U.S. Application Data

(63) Continuation of application No. 09/836,679, filed on Apr. 16, 2001, now Pat. No. 6,533,364.

(51) Int. Cl.[7] .......................... B60B 27/00; B60B 23/00; B60B 37/00; F16C 19/54
(52) U.S. Cl. ................................. 301/110.5; 301/105.1; 301/111.03; 384/452
(58) Field of Search ........................... 301/105.1, 110.5, 301/108.1, 108.4, 109, 110, 111.01, 111.03, 111.04, 59, 110.6; 384/107, 452

(56) References Cited

U.S. PATENT DOCUMENTS

| | | | | |
|---|---|---|---|---|
| 648,426 A | * | 5/1900 | Olund et al. ............ 301/111.03 |
| 700,583 A | * | 5/1902 | Van Luven ................. 384/452 |
| 913,529 A | * | 2/1909 | Matta ......................... 384/452 |
| 1,515,940 A | * | 11/1924 | Edwards .................. 301/105.1 |
| 5,451,097 A | * | 9/1995 | Fu et al. .................. 301/110.6 |
| 5,938,293 A | * | 8/1999 | Dietrich ................... 301/110.5 |
| 6,267,452 B1 | * | 7/2001 | Lin .......................... 301/110.5 |
| 6,302,589 B1 | * | 10/2001 | Van Houtte ................ 384/452 |
| 6,533,364 B2 | * | 3/2003 | Lew ........................ 301/110.5 |

* cited by examiner

Primary Examiner—S. Joseph Morano
Assistant Examiner—Jason R. Bellinger
(74) Attorney, Agent, or Firm—Dana Alden

(57) ABSTRACT

A wheel hub that provides a wheel that is free-wheeling in both directions of turning and is constructed to provide low rolling resistance, greater load carrying capacity and is more reliable that earlier hubs. The hub includes separate bearing systems for supporting, respectively, radial loads as perpendicular to a road surface, and axial loads as are side loads directed into the hub. The separate bearing systems include a pair of radial bearings for supporting radial loads, with each radial bearing of the pair mounted at each hub end to receive an axle fitted therethrough, and a pair of thrust bearings for supporting axial loads, with each thrust bearing of the pair mounted at a hub end, between the radial bearings outer surfaces and an axle mounting to a frame.

8 Claims, 5 Drawing Sheets

WHEEL HUB

This is a continuation of application Ser. No. 09/836,679, filed Apr. 16, 2001 Now U.S. Pat. No. 6,533,364.

BACKGROUND OF THE INVENTION

1. Field of the Invention

The present invention relates to wheel hubs as are used on bicycles, and other types of wheel hubs, where the hub is free wheeling and provides separate bearing systems for minimizing radial and axial loads.

2. Prior Art

Wheel hubs, in our modem age, have incorporated bearings that are fitted between a wheel hub and axle to support axial loads and to minimize rolling friction forces. Such bearings have taken many forms and configurations but generally have provided bearing arrangements that are fitted between an axle and hub for supporting loads as are directed into the hub from a road surface and lateral or axial forces. Such arrangements usually consist of a pair of bearings that are fitted to each hub end and wherethrough an axle is positioned to support radial loads, often ignoring axial loads. Where bearing arrangements have been designed to handle both radial and axial loads, as for example frustum cone bearings as are used on automobile axles, such bearings lack efficiency, are subject to wear and require periodic inspections and repairs.

The present invention recognizes that forces as are directed axially into a hub axle cannot be ignored, nor can a single pair of bearings efficiently handle both loads as are directed from the road, or loads that are perpendicular to such road, and axial loads as are directed through the axle. Accordingly, the invention provides separate bearing arrangements for handling, respectively, radial loads as are directed perpendicular to a road surface and axial loads as are directed through an axle fitted through the hub. Specifically, the invention employs a pair of bearings that support the hub ends to an axle, and are for supporting radial loads, and further includes a pair of thrust bears, one located at each hub end, to separate the radial bearing in that hub end from a spacer or from a nut turner over an axle end, that support axial loads.

SUMMARY OF THE INVENTION

A wheel hub of the invention is constructed to provide low rolling resistance, greater load carrying capacity, is more reliable, and is therefore operated with less maintenance costs. The hub provides for mounting a wheel thereto, such as by spokes, with the hub connected at the spoke ends that, in turn, connect to a rim at the other spoke ends, as a free-wheeling wheel. Radial loads that are directed into the hub, as from a road surface, are supported by a pair of roller bearings, with one roller bearing mounted to or installed in each side of the hub and wherethrough an axle is fitted. Axial loads, as are directed into the hub are loads that are at a right angle to the radial loads, and are handled by thrust bearings that have center openings therein for fitting over the axle and are positioned into cavities formed in the hub sides. So arranged, each thrust bearing is positioned to have one side against an outer surface of a radial bearing, and with the other thrust bearing side maintained against a spacer and is held there with a nut turned over a threaded axle end.

The roller bearings are preferably standard bearings that include inner and outer racers that have cylindrical rollers or ball bearings journaled therebetween, and the thrust bearings are preferably like disk shaped plate that are maintained together around their outer circumferences, are open through their centers to pass the axle, and include radial slots that align in pairs to provide seats wherein individual needle bearings are journaled.

It is a principal object of the present invention to provide a hub that is free-wheeling and includes pairs of radial and thrust bearings that are for supporting, respectively, radial loads as are directed perpendicular into the hub, as from a road surface, and axial loads, as are directed into the hub through an axle and are essentially perpendicular to the radial loads.

Another object of the present invention is to provide a wheel hub where the radial bearings are conventional ball or roller bearings having inner and outer races with the balls or rollers journaled to turn freely therebetween.

Another object of the present invention is to provide a thrust bearing that includes like separate flat disks that are connected around their outer edges, are open through the center thereof to pass an axle therethrough, and include radial slots formed in each disk that align in pairs, each pair of aligned slots to receive a needle bearing journaled therein.

Still another object of the present invention is to provide an axle load support consisting of pairs of radial and thrust bearings that are easily assembled in and onto the hub ends, with the hub and bearings all including openings that align to pass an axle therethrough.

Still another object of the present invention is to provide a combination of a hub with radial and thrust bearings that are easily assembled to receive an axle fitted therethrough that is arranged to be mounted to a frame at the axle ends.

BRIEF DESCRIPTION OF THE DRAWINGS

These and other objects and features of the present invention will become more apparent from the following description in which the invention is described in detail in conjunction with the accompanying drawings.

DETAILED DESCRIPTION

The invention, as is hereinafter described, relates to wheel hubs that are freewheeling in either direction of turning during operation.

Figure 1:
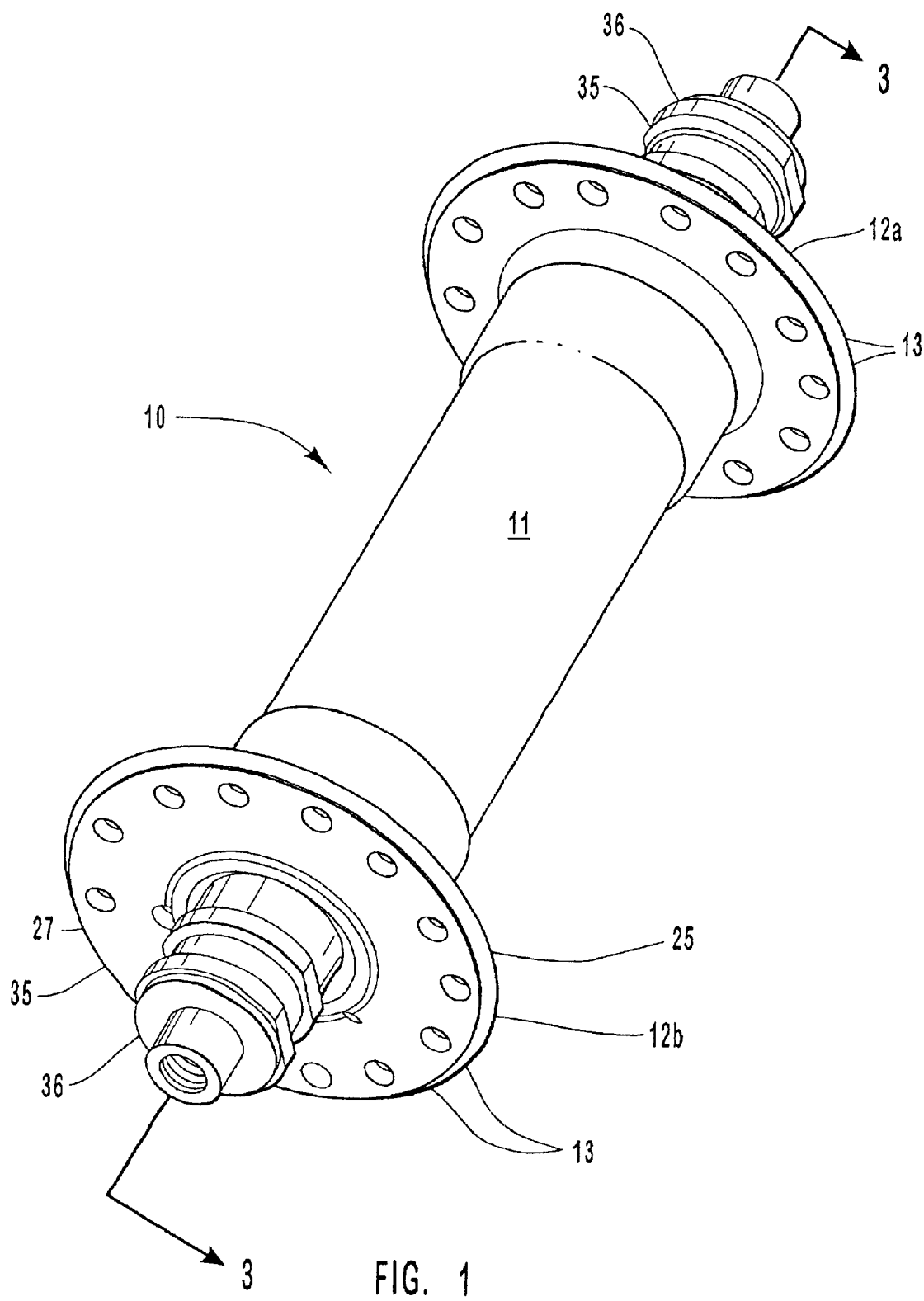
FIG. 1 is aside and end elevation perspective view of an assembled hub of the invention.
Figure 3:
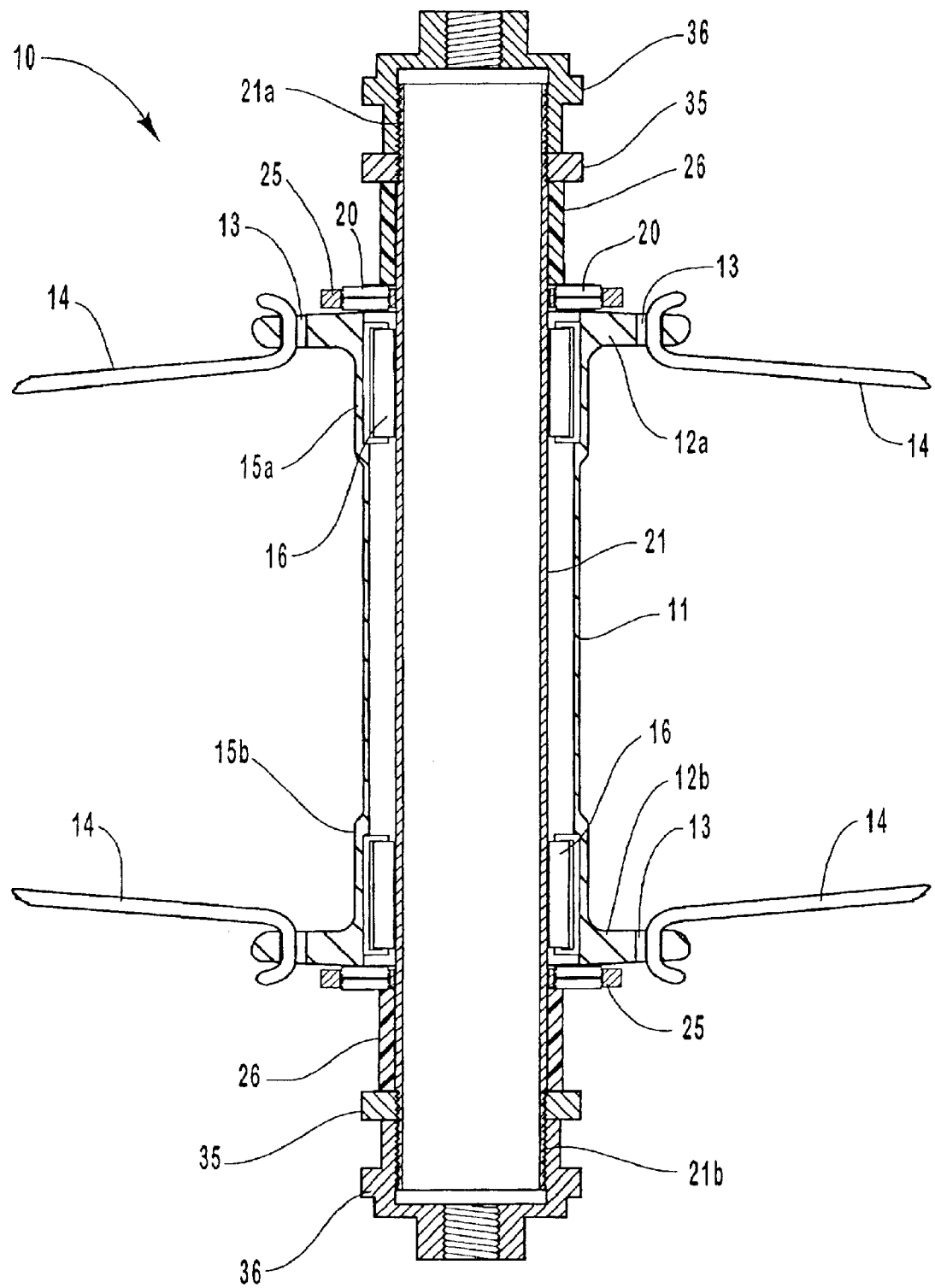
FIG. 3 is a profile sectional view taken along the line 3—3 of the hub of FIG. 1 and includes ends of spokes fitted onto the hub.
Figure 4:
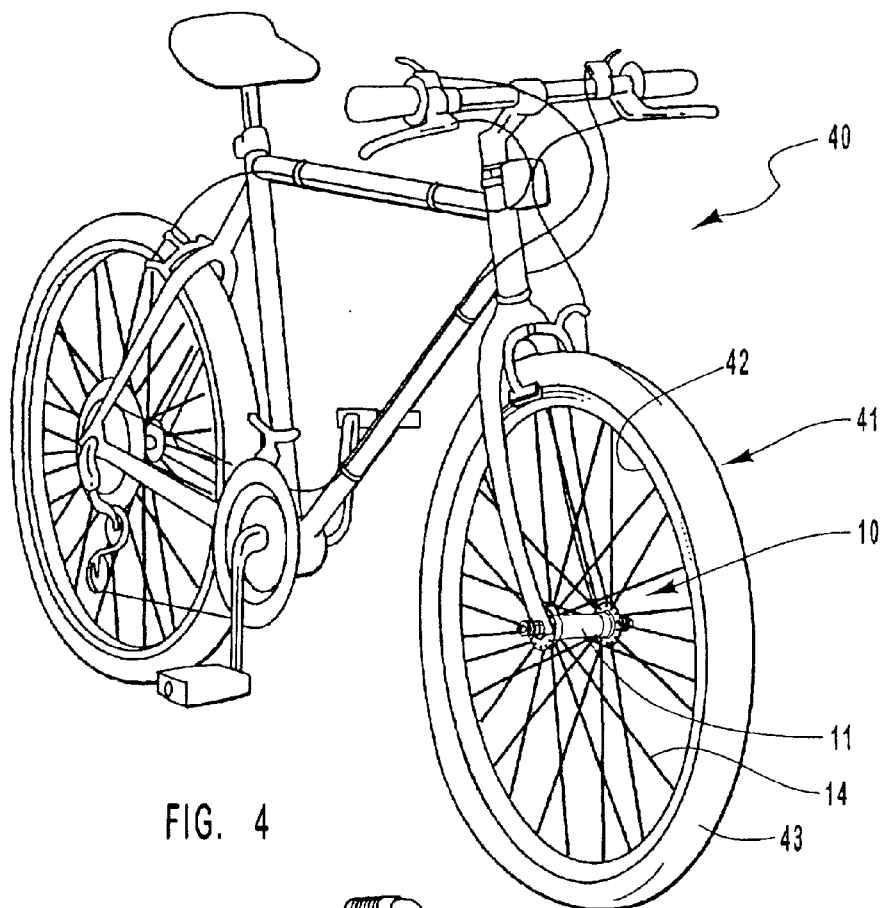
FIG. 4 is a side and front elevation view of a bicycle having a front wheel that includes the hub of the invention.
Figure 5:
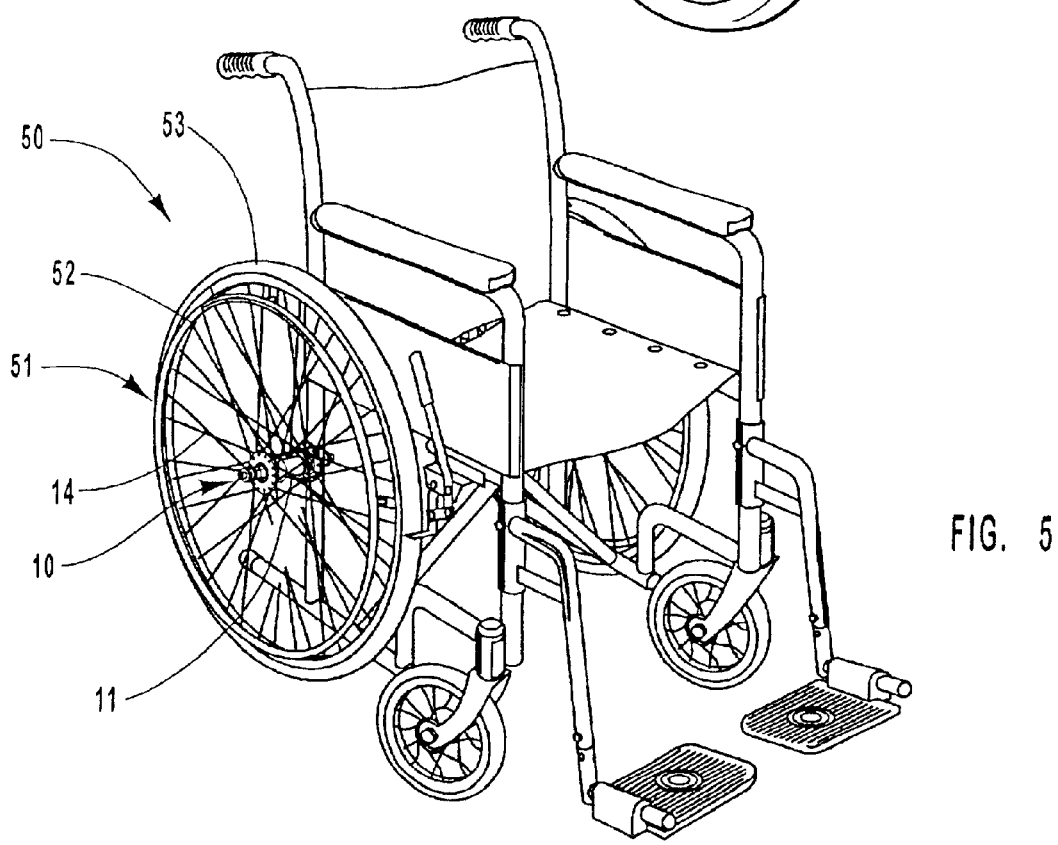
FIG. 5 is a side and front elevation view of a wheel chair having rear wheels that incorporate the hub of the invention.

FIG. 1 shows a hub 10 of the invention that has been configured to serve as a hub for a bicycle or wheel chair, as shown in FIGS. 4 and 5, or like wheel that is free-wheeling. The hub 10 includes a cylindrical hub body 11 having end flanges 12a and 12b that are formed on each hub body end that each include holes 13 formed at spaced intervals around the outwardly extending flanges. Which holes 13 are spaced equidistantly from the hub flange outer circumference, and are to receive spokes 14 mounted therein, as shown in FIG. 3. The cylindrical hub body is open therethrough and includes outwardly stepped sections 15a and 15b that are formed in the hub body, adjacent to the opening therethrough. Which stepped sections 15a and 15b inner walls are to receive radial bearings 16, respectively, fitted therein, as shown in FIGS. 2 and 3.

Figure 2:
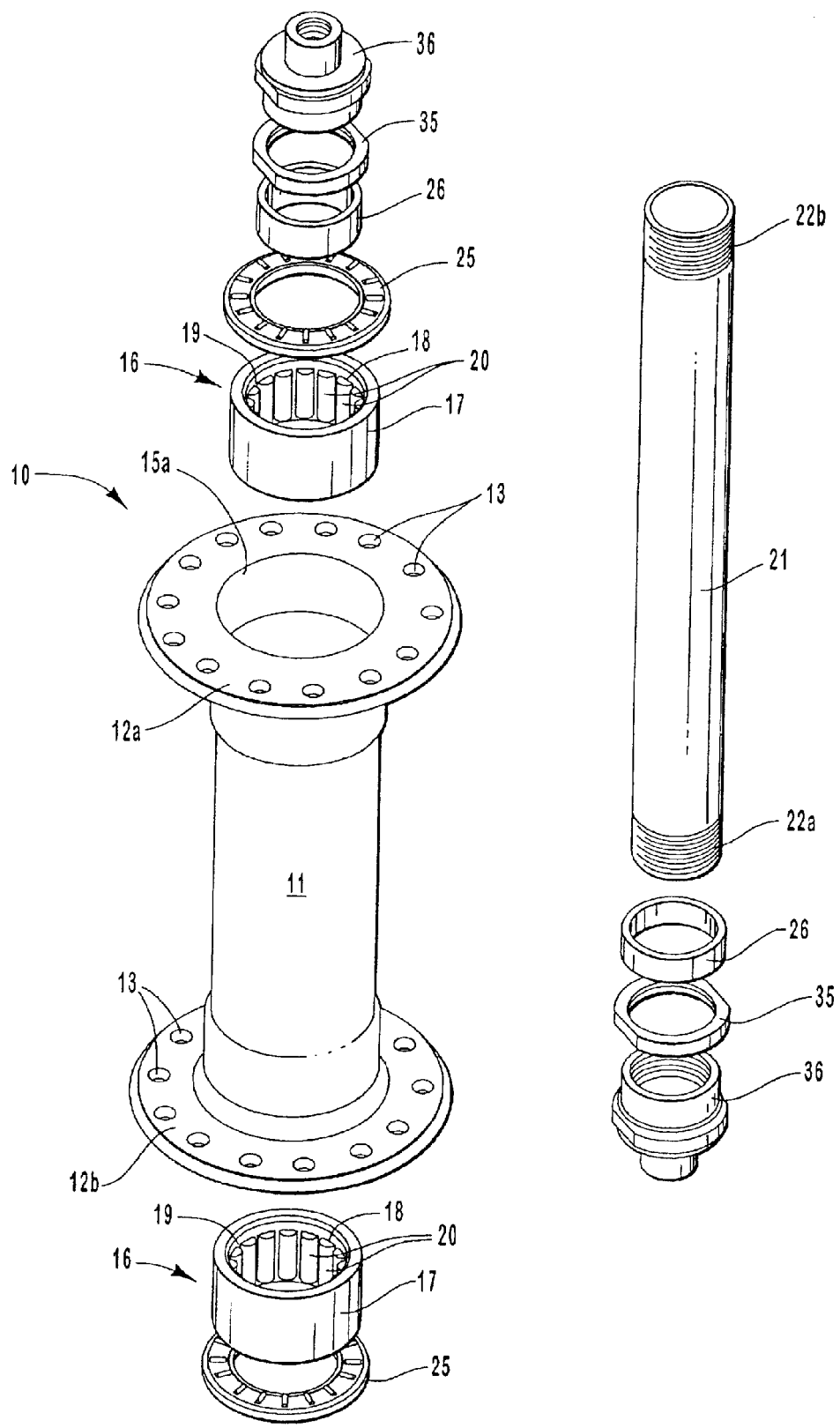
FIG. 2 is a exploded side elevation perspective view of the hub of FIG. 1.

The radial bearings 16, shown best in FIG. 2, are identical and interchangeable, and each includes an outer race 17 and an inner race 18, with the inner race including like spaced lateral slots 19 formed thereacross that receive roller bearings 20 journaled therein. With, when the radial bearings 16 are fitted in the cylindrical hub body 11, contacting the stepped sections 15a and 15b inner surfaces, as shown in FIGS. 3 and 4, an axle 21, that is shown as a straight pipe that has been threaded on both ends 22a and 22b, is fitted through the cylindrical hub body 11. The axle outer surface is supported on and between the roller bearings 20 allowing the hub cylindrical body to turn freely on the axle 21. So arranged, radial forces as are directed perpendicularly from a road surface, through a wheel mounting the hub 10, and pass into the radial bearings 16, are handled or supported by the radial bearing 16 that allow a free rotation of the hub 10 on axle 21. While radial bearings 16 are shown in FIGS. 2 and 3 as including rollers bearings 20, it should be understood that, within the scope of this disclosure, other types of bearings, such as ball bearings, or the like, could be so used to support radial loads as are directed into the hub 10, within the scope of this disclosure.

Figure 2A:
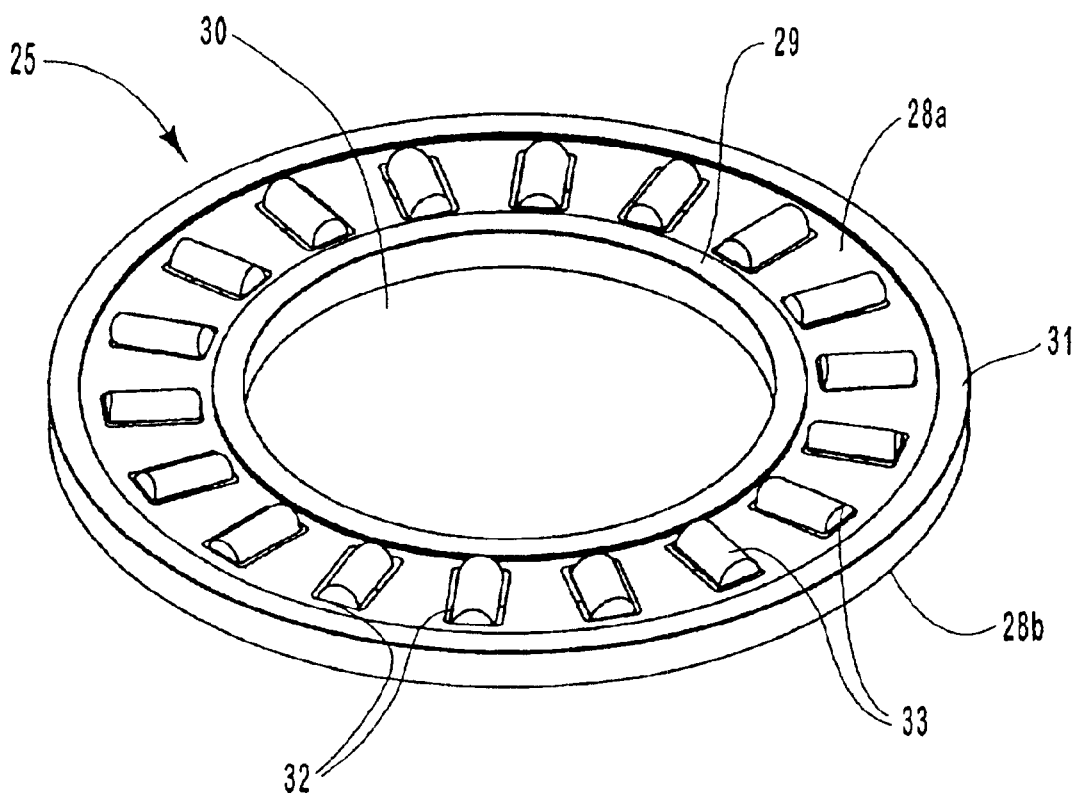
FIG. 2A is an enlarged top and side elevation view of a thrust bearing removed from the hub of FIG. 2.

Additional to radial loads as are directed into the hub, hub 10, when used as a bicycle wheel hub, wheel chair hub, or for other application, will also experience axial forces that are essentially perpendicular to radial forces. Such axial forces tend to urge the hub cylindrical body 11 ends into a mounting that secures the axle ends onto a fixed frame, like the frames of bicycle 40 or wheel chair 50, as shown in FIGS. 4 and 5, respectively. Such axial forces tend to urge the hub 10 along the axle 21, producing unwanted friction losses. To minimize or avoid such side load friction losses, the invention employs thrust bearings 25 that, as shown best in FIGS. 2 and 3, are each arranged to slide along the axle 21, fitting between the outer surfaces of radial bearings 16 and inner ends of sleeves 26 that are shown as cylinders and are each slid, over an axle end 22a and 22b. So arranged, an inner face of sleeve 26 is maintained against an outer surface of each of the pair of thrust bearings 25. The thrust bearings 25 are identical and, as shown in FIG. 2A, each thrust bearing 25 includes a pair of like shaped flat disks 28a and 28b that are joined together at common inner edges 29 that are the disk 28a and 28b inner edges around a center axle opening 30. The thrust bearings each further include an outer coupling ring 31 that holds the disks 28a and 28b together around their outer circumferences. The disks 28a and 28b, as shown, include radial slots 32 that align in pairs to receive needle bearings 33 journaled therein. So arranged, with a thrust bearing 25 sandwiched between a radial bearing 16 outer surface and an inner surface of sleeve 26, a turning of the hub cylindrical body 11 is supported by the thrust bearing. In such turning, each sleeve 26 end is supported on needle bearings 33, minimizing friction between the fixed sleeve 26 end the side of hub cylindrical body 11.

To complete the assembly of hub 10, with the sleeves 26 installed onto the axle 21 threaded ends 22a and 22b, internally threaded lock nuts 35 are fitted and turned onto the axle threaded ends 22a and 22b, followed by a turning of end caps 36 over the axle threaded ends, completing the hub assembly.

Shown in FIG. 4, the hub 10 is part of a front wheel assembly 41 of a bicycle 40, with the hub cylindrical body 11 shown as including spokes 14 that extend radially therefrom and are secured into a rim 42 whereon a tire is mounted, completing the wheel 41. Similarly, FIG. 5 shows the hub 10 as part of each of a pair of rear wheels 51 of a wheel chair 50, with the hub cylindrical body 11 shown as including spokes 14 that extend radially therefrom and to a rim 52 that has a tire 53 mounted thereto. Which utilizations of a hub 10, as shown in FIGS. 4 and 5, are examples of several appropriate uses of the invention. It should, however, be understood that the hub 10, that includes both radial bearings 16 for supporting loads as are directed perpendicular from a road surface and thrust bearings 25 for supporting axial loads as are directed into the hub axle 21, can be incorporated with other axles, within the scope of this disclosure. For example, present automobile wheel freewheeling hubs include, at both hub ends, cone bearings that each have a frustum cone shape and are provided to handle both a radial and axial forces. Such cone bearing can be replaced with the hub 10 of the invention to function more efficiently than a cone bearings that, in fact, is a compromise in that such cone bearing must handle both radial and axial forces as are directed into an automobile wheel during normal use, and such compromise lacks the efficiency that the inclusion of the pairs of radial and thrust bearings 16 and 25, of the invention, provides. In practice, a hub 10 is more efficient in reducing friction losses that such earlier cone bearings.

Hereinabove has been set out a description of the freewheeling hub of the invention that is useful on any vehicle or assembly where load forces are directed both radially and axially into the hub. It should, however, be understood that the present invention can be varied within the scope of this disclosure without departing from the subject matter coming within the scope of the following claims, and a reasonable equivalency thereof, which claims I regard as my invention.

I claim:

1. A hub for a wheel that is free-wheeling comprising, a cylindrical hub body that is open therethrough that includes means for mounting a wheel; cavities formed in said cylindrical hub body that are adjacent to opposite ends of said cylindrical hub body for seating radial bearings; a pair of radial bearings each having inner and outer races with bearing means journaled therebetween, and each of which said inner races is open therethrough to pass an axle; a straight axle for fitting through each said radial bearings inner race; a pair of thrust bearing means, one each for sliding along said axle to have an inner face thereof in contact with an outer surface of said radial bearing; and cap means, each for securing over one axle end and engaging an outer face of one of said thrust bearing means.

2. The hub as recited in claim 1, wherein the cylindrical hub body includes right angle flanges that extend outwardly from said cylindrical hub body and include equally spaced holes that are spaced equal distances from said flange outer circumference that are for receiving ends of wheel spokes secured therein.

3. The hub as recited in claim 1, wherein the radial bearings include roller bearings journaled between the inner and outer races as the bearing means.

4. The hub as recited in claim 1, wherein the radial bearings include ball bearings journaled between the inner and outer races as the bearing means.

5. The hub as recited in claim 1, wherein the thrust bearing means are a pair of identical thrust bearings that each include a pair of like size inner and outer disks for fitting together and means for maintaining said inner and outer disks together, forming a disk that is open across its center to pass the axle therethrough, and both said inner and outer disks include equally spaced radial openings that individually align as pairs, with each pair to receive a needle bearing journaled therein, and which said needle bearings are each in contact with the radial bearing outer surface and a face of the cap means.

6. The hub as recited in claim 5, wherein the means for maintaining the inner and outer disks together are a pair of a ring shaped clamp means, one each for fitting and clamping over said inner and outer disk inner and outer circumference edges.

7. The hub as recited in claim 1, wherein the axle is provided with ends that are threaded; and the cap means includes a pair of threaded nuts, each for turning over an axle threaded end, and a pair of like caps that are each internally threaded to be turned over each said axle threaded end.

8. The hub as recited in claim 1, further including a pair of spacers, one each for fitting over an axle end that are each for positioning between the thrust bearing means outer surface and the cap means.

* * * * *